United States Patent [19]

Soloff

[11] Patent Number: 5,138,452
[45] Date of Patent: Aug. 11, 1992

[54] METHOD AND APPARATUS FOR TRANSFORMING VIDEO IMAGES USING UP-SAMPLED DIGITAL VIDEO SIGNALS

[75] Inventor: Jon Soloff, Basingstoke, Great Britain

[73] Assignee: Abekas Video Systems Limited, Berkshire, United Kingdom

[21] Appl. No.: 709,353

[22] Filed: Jun. 3, 1991

[30] Foreign Application Priority Data

Jun. 4, 1990 [GB] United Kingdom ............... 9012423

[51] Int. Cl.$^5$ .................... H04N 5/14; H04N 7/12; H04N 3/223
[52] U.S. Cl. ................................. 358/166; 358/180; 358/138
[58] Field of Search ............ 358/180, 166, 138, 133, 358/135, 136, 160

[56] References Cited

U.S. PATENT DOCUMENTS

| | | | |
|---|---|---|---|
| 4,792,856 | 12/1988 | Shiratsuchi | 358/180 |
| 4,866,519 | 9/1989 | Lucas | 358/138 |
| 5,019,903 | 5/1991 | Dougall | 358/138 |
| 5,047,857 | 9/1991 | Duffield | 358/180 |
| 5,050,230 | 9/1991 | Jones | 358/166 |

FOREIGN PATENT DOCUMENTS 0259004 3/1988 European Pat. Off. .

*Primary Examiner*—James J. Groody
*Assistant Examiner*—Sherrie Hsia
*Attorney, Agent, or Firm*—Limbach & Limbach

[57] ABSTRACT

A method of transforming a video image includes sampling a digital video signal at a higher frequency $f_2$ than a usual frequency $f_1$ and storing the sampled signals. The stored information is interpolated and addressed so as to create a video signal representing a required transformation, the frequency of the video signal being reduced to the usual sampling frequency $f_1$. The method can be applied for enlarging and reducing the video image. Where the image is reduced, the reduction is limited to prevent the effect of interference between Fourier spectral harmonic bands and a fundamental band of the components of a reduced video image signal when it is created from the stored information. Preferably, the reduction is limited to provide gaps or guard bands which prevent this interference. The method advantageously provides high resolution horizontal components in the transformed video image.

4 Claims, 2 Drawing Sheets

METHOD AND APPARATUS FOR TRANSFORMING VIDEO IMAGES USING UP-SAMPLED DIGITAL VIDEO SIGNALS

FIELD OF THE INVENTION

This invention relates to a method and apparatus for transforming the shape of a video image on a screen and in particular to such a method wherein the resolution of a horizontal component of the video signal (such as a luminance or colour signal) is improved.

BACKGROUND OF THE INVENTION

Various special effects are used in displaying video images in television. One kind of special effect involves a reduction in the size of an image as seen on a screen. Other kinds of special effects involve enlargement, or rotation of the image. Such effects generally include scaling the image in some way and these effects will be generally referred to as transforming the shape of a video image on a screen.

In the case of reducing the shape of a video image by conventional techniques, wherein the bandwidth of the video signal is reduced by a comparatively large filter prior to compression in time and expansion in the frequency domain, such pre-filtering must be carried out before the compression to reduce "aliasing", i.e. degradation of picture quality. Compression has the effect of "folding back" the components of the signal and it is necessary to attenuate sufficiently any frequencies which will be folded back, since they would otherwise be manifested as undesirable frequency components that cause aliasing. Besides the cost and complexity of using large filters, if it is necessary to achieve a high quality image, then it would also be necessary to use a comparatively large interpolating circuit with sharp roll-off frequencies. Such a circuit can also be costly and complex.

When transforming a video image to create other special effects, similar and other problems exist when using conventional techniques.

The present invention generally seeks to provide an improvement in the resolution of a horizontal component of a digital video signal which is used in a technique of transforming a video image on a screen. In the case where the transformation is a reduction in image size, other advantages can be obtained in the form of a simplification of circuitry as long as certain design parameters are not exceeded.

SUMMARY OF THE INVENTION

In accordance with the broadest aspect of the invention, a method of transforming a video image on a screen comprises the steps of:
sampling a digital video signal at a frequency $f_2$ which is higher than a usual sampling frequency $f_1$, where $f_2$ is related to $f_1$ by a factor "n" and "n" is related to the amount by which the video image is required to be transformed,
storing the sampled signals as information in storage means,
interpolating and addressing the information in the storage means in such a way as to provide video signals which represent a predetermined transformation of the video image, and
reducing the frequency of the latter video signals to provide output signals at the usual sampling frequency $f_1$.

Since the digital video signal is "up-sampled" at a higher frequency $f_2$ than its usual sampling frequency $f_1$, the effect is to provide more information than usual. This information is stored and the stored information is interpolated and addressed to provide a transformed video image. As more information is available than usual, it results in high resolution horizontal components in the transformed video image. A suitable addressing circuit generates addresses at frequency $f_2$ where each address consists of an integer part supplied to the storage means and a fractional part supplied to an interpolator. The interpolated output can then be down-sampled, i.e. sampled at the lower frequency of $f_1$ to provide the output signals for creating the transformed image on a screen.

Where the transformation of the video image concerns a reduction in image size, "n" is limited so as primarily to prevent the effect of Fourier spectral harmonic bands from overlapping a fundamental band as the reduced video image signal is created from the stored information. Preferably, n is limited so as to effectively locate gaps or guard bands between harmonic components of a Fourier frequency spectrum of the digital signal and the fundamental component. These gaps or guard bands then prevent these harmonic components from overlapping desirable fundamental frequency bands of the video output signal and hence substantially eliminate aliasing, i.e. when the stored information is used to create the transformed video image at the usual sampling frequency $f_1$. Generally, if $n=f_2/f_1$ then the limit on image reduction is $1/(2n-1)$. For example, an image can be reduced by up to ⅓ where $f_2=2f_1$, but can be reduced by up to 1/7 where $f_2=4f_1$. In practice, with presently available hardware, it is usual for $f_2=2f_1$. However, higher up-sampling rates are envisaged for the future.

If the storage means were large enough to store sufficient information, there would be no need for interpolation means to control the transformation of the video image since enough information could be selectively extracted from the storage means, depending on the location of data in a given transformation plane. However, in practice, an interpolator is used to control, for example, the amount that an image is scaled up or down. The up-sampling used in the invention provides extra stored information which can be used to improve the resolution of the horizontal component of the video image so that the interpolator can produce a better quality signal. Thus constraints on interpolation are reduced and a more simple interpolator can be used as $f_2$ increases. Such an interpolator does not need to have sharp roll-off frequencies, because it is only necessary for the characteristic of the circuit to be substantially flat for the highest required frequency and slower roll-offs can therefore be tolerated.

When the invention is applied image reduction, the large filter and more complex interpolator are not required as used in conventional circuits. In the invention, as long as n is suitably limited, improved resolution is obtained without aliasing. However, in practice, or where the edges of the guard bands are not precisely defined, simple filters can be used with the invention to ensure high fidelity images.

In preferred embodiments of the invention, a near perfect transformation of the picture can be achieved because the base band of the video signal is not compromised. Therefore, an image transformed by the technique of the invention is extremely sharp in quality and it is achieved without the expense of more complex circuitry than the prior art.

An embodiment of the invention will now be described, by way of an example, with reference to the accompanying Drawings in which:

FIG. 1 schematically illustrates apparatus in accordance with an embodiment of the invention, and FIGS. 2 (a)-2 (h) are schematic Fourier frequency spectra, and FIGS. 3 (a) and 3 (b) are schematic filter characteristics.

DETAILED DESCRIPTION OF THE PREFERRED EMBODIMENT

An example of the invention will be described, with reference to FIGS. 1 and 2, for reducing a video image by one half. However, it will be understood that the invention can be adapted to reduce or to expand an image by different scaling factors, and/or to transform the image in other ways as well as to rotate the image.

Figure 1:
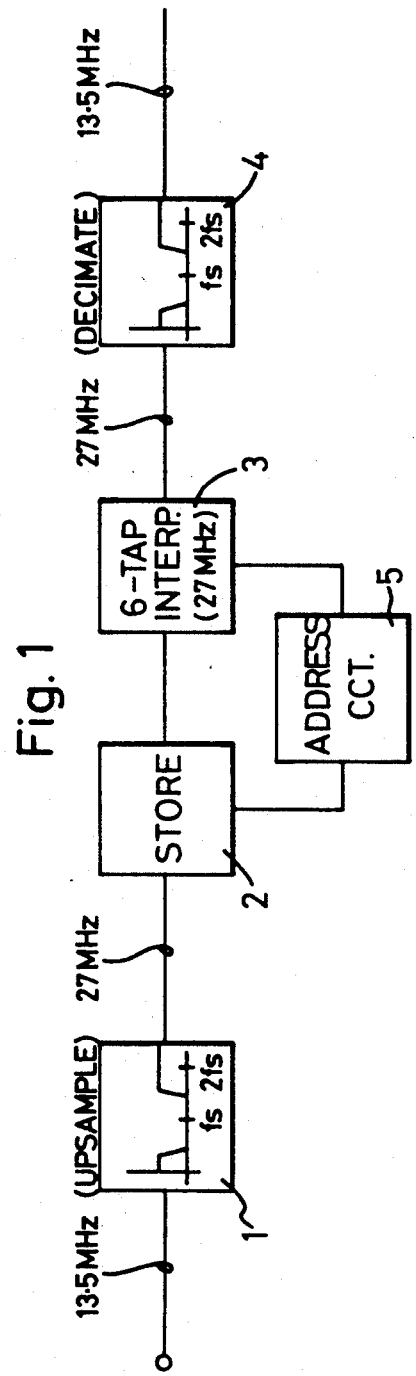

As shown in FIG. 1, a circuit for halving an image receives a video signal which is usually sampled at $f_1 = 13.5$ MHz but in this instance is supplied to means 1 for linearly up-sampling, i.e. increasing the sampling frequency, to $f_2 = 27$ MHz. An address circuit 5 is connected to both the store 2 and the interpolator 3. The address circuit 5 generates an address consisting of an integer part which is supplied to the store 2 and a fractional part which is supplied to the interpolator 3. The addresses are generated at the frequency $f_2$ which is 27 MHz in this example. The interpolator 3 provides digital values required for transforming the image and, in this case, to provide image reduction. The interpolator 3 is connected to so-called "decimating" means 4, which pre-filters and down-samples, i.e. samples at a decreased frequency in order to provide reduced image video signals e.g. at the original sampling rate of $f_1 = 13.5$ MHz.

The basic construction and operation of the individual circuit components 1-5 will be known to those skilled in the art and hence require no detailed explanation.

Figure 2:
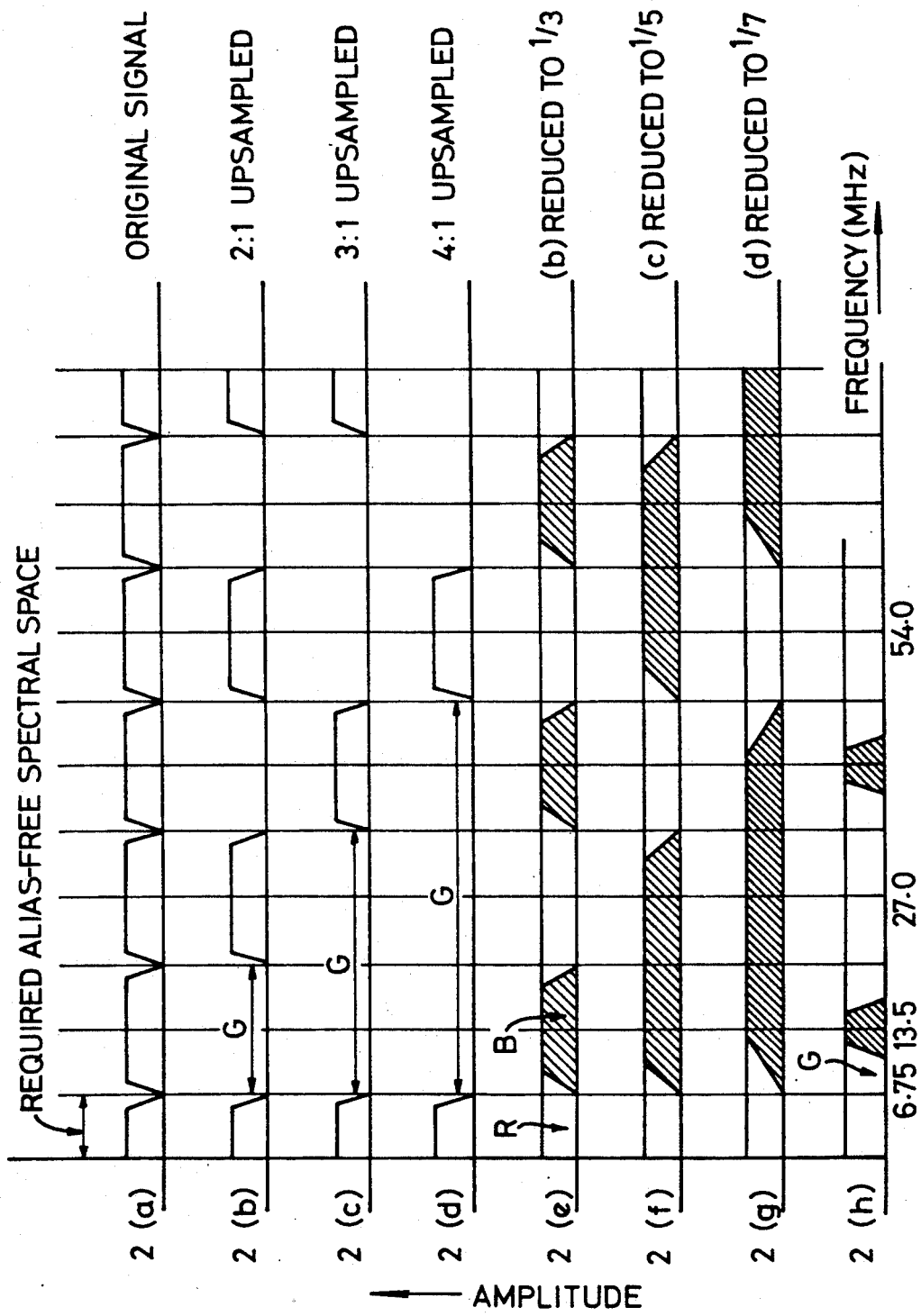

Reference is now made to FIG. 2 which shows various schematic Fourier frequency spectra to illustrate the required operation of the circuit. It will be understood that the Fourier spectra exists on both sides of the vertical amplitude axis, but only one side has been shown to simplify the drawing.

FIG. 2 (a) schematically illustrates the spectra of an original video signal which is usually sampled at $f_1 = 13.5$ MHz. This consists of a fundamental band centered on the vertical amplitude axis and a series of harmonic bands extending either side (only the positive side being shown). These harmonic bands extend over multiples of 13.5 MHz as shown in the drawing.

FIG. 2 (b) shows the result of up-sampling to $2f_1$, i.e. to $f_2 = 27$ MHz, which has the effect of introducing gaps G, extending over 13.5 MHz intervals, between each of the harmonic bands. FIG. 2 (c) shows a similar effect where $f_2 = 3f_1$ and FIG. 2 (d) shows the effect when $f_2 = 4f_1$. As the up-sampling frequency is increased, so the gaps G widen. In the preferred embodiment of the invention, $f_2 = 2f_1$ for practical reasons.

In this example of the invention, the video image is reduced in size by appropriately addressing store 2 from circuit 5 and interpolating stored information, by means of interpolator 3, to provide video signals to the decimator 4 which supplies video image output signals at 13.5 MHz. Whereas the process of up-sampling spreads and separates the spectral harmonic bands—as shown in FIG. 2 (b) to FIG. 2 (d)—the process of extracting information from store 2 and creating the reduced size video image signals causes the spectral bands to expand, thereby closing gaps G. Continued reduction causes the bands to overlap as shown by the crossed hatched regions in FIGS. 2 (e), 2 (f) and 2 (g). FIG. 2 (e) represents a reduction to ⅓ of the signal which is up-sampled at $f_2 = 2f_1$ and has the spectral distribution shown in FIG. 2 (b). Similarly, FIG. 2 (f) represents a reduction to 1/5 of the signal shown in FIG. 2 (c), and FIG. 2 (g) shows a reduction to 1/7 of the signal shown in FIG. 2 (d). Thus, spectra 2 (e)-2 (g) shows the spectra of 2 (b)-2 (d) respectively after transformation resulting in a horizontal reduction in size which just avoids aliasing, i.e. the limit on horizontal image reduction. Aliasing would occur when the first side band B, e.g. see FIG. 2 (e), extends into region R extending from 0 to 6.75 MHz. Thus, FIGS. 2 (e)-2 (g) represent conditions where the respective harmonic bands B just touch the frequency of 6.75 MHz which is the boundary of the fundamental band of the required signal.

Since the guard band G increases in size with an increase in the up-sampling frequency $f_2$, increasing $f_2$ allows the video image to be reduced further before aliasing occurs. In practice, it is preferable to leave a small effective gap G between the base band region (6.75 MHz) and harmonic band, as shown in FIG. 2 (h) in order to provide a "guard band" where no frequency overlap occurs. In practice, the base band may effectively extend to about 5.5 MHz in the illustrated example and the cross-hatched overlap shown in FIG. 2 (h) is not a problem. However, a clearer gap G could be left if required.

Figure 3:
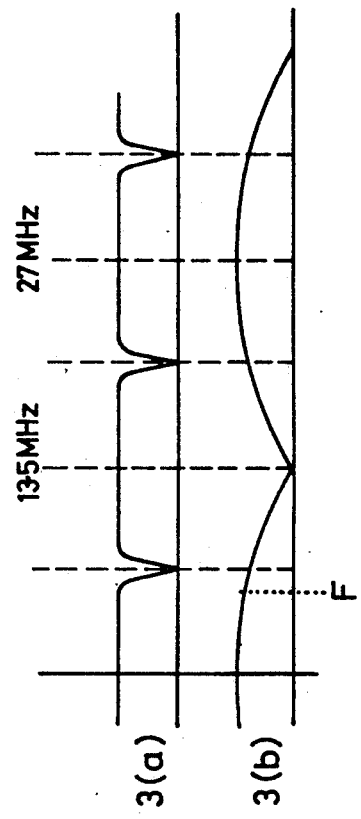

FIG. 3 (a) illustrates the frequency response required with a 13.5 MHz interpolating circuit operating in accordance with conventional techniques. Here, there is a need for sharp roll-off frequencies to achieve a high picture quality (besides the need for pre-filtering before compression).

FIG. 3 (b) illustrates the characteristic of a 27 MHz interpolating circuit as used in FIG. 1. This has a much more relaxed frequency response—since it needs to provide only a flat characteristic to the highest required frequency. Therefore, slower roll-off frequencies can be tolerated.

The technique of the invention is intended to operate on the horizontal component of transformation of digital video image signals and it can be used to improve the resolution of this component in different image transformations which are carried out to achieve the required special effects.

The technique of the invention can be used with a luminance signal or with a colour signal. With a colour signal, the sampling frequency would normally be half that required for a luminance signal but the principles of operation remain the same.

Whilst filters may not theoretically be required to remove aliasing when the invention is used, simple filters (as opposed to the large filters used in conventional techniques) can be included in the circuit to eliminate minor aliasing components. Such components may be present due to acceptable minor imperfections in practical circuitry.

I claim:

1. A method of transforming a video image to reduce image size of the video image, comprising the steps of:

sampling a digital video signal representing the video image at a frequency $f_2$, which is higher than a usual sampling frequency $f_1$, where $f_2$ is related to $f_1$ by a factor "n" and "n" is related to an amount by which the video image is required to be transformed, storing the sampled signals as information in storage means, interpolating and addressing the information in the storage means in such a way as to provide transformed video signals representing a transformed version of the video image, and reducing the frequency of the transformed video signals to provide output signals at the usual sampling frequency $f_1$, wherein the transformed version of the video image has a size that is reduced relative to the image size of the video image by an image reduction factor of up to $1/(2n-1)$ where $n=f_2/f_1$.

2. A method according to claim 1 wherein "n" is limited for effectively locating gaps or guard bands between harmonic components and a fundamental component of a Fourier frequency spectrum of the digital video signal.

3. An apparatus for transforming a video image having a first size when displayed on a screen, including:

means for sampling a digital video signal representing the video image at a frequency $f_2$, which is higher than a usual sampling frequency $f_1$, where $f_2$ is related to $f_1$ by a factor "n" and "n" is related to an amount by which the video image is required to be transformed, storage means for storing the sampled signals as information, interpolating means and addressing means for interpolating and addressing the information in the storage means in such a way as to provide transformed video signals representing a transformed version of the video image, and means for reducing the frequency of the transformed video signals to provide output signals at the usual sampling frequency $f_1$, wherein the transformed version of the video image has a size when displayed on said screen that is reduced relative to the first size by an image reduction factor of up to $1/(2n-1)$ where $n=f_2/f_1$.

4. The apparatus of claim 3 where "n" is limited for effectively locating gaps or guard bands between harmonic components and a fundamental component of a Fourier frequency spectrum of the digital video signal.

* * * * *